US008814147B2

(12) United States Patent
Sheng

(10) Patent No.: US 8,814,147 B2
(45) Date of Patent: Aug. 26, 2014

(54) SYSTEM FOR FEEDING GAS INTO LIQUID

(75) Inventor: Guohua Sheng, Beijing (CN)

(73) Assignee: Fresh Water (Beijing) Technology Co., Ltd., Beijing (CN)

( * ) Notice: Subject to any disclaimer, the term of this patent is extended or adjusted under 35 U.S.C. 154(b) by 1094 days.

(21) Appl. No.: 12/672,059

(22) PCT Filed: Jul. 24, 2008

(86) PCT No.: PCT/CN2008/071733
§ 371 (c)(1),
(2), (4) Date: Dec. 27, 2010

(87) PCT Pub. No.: WO2009/018745
PCT Pub. Date: Feb. 12, 2009

(65) Prior Publication Data
US 2011/0089582 A1 Apr. 21, 2011

(30) Foreign Application Priority Data
Aug. 3, 2007 (CN) .......................... 2007 1 0119934

(51) Int. Cl.
*B01F 3/04* (2006.01)
*B01F 15/02* (2006.01)
*C02F 3/22* (2006.01)

(52) U.S. Cl.
CPC ......... *B01F 3/04496* (2013.01); *B01F 15/0218* (2013.01); *C02F 3/22* (2013.01)
USPC .......... 261/72.1; 261/84; 261/115; 261/121.1

(58) Field of Classification Search
CPC ..... B01F 3/04496; B01F 15/0218; C02F 3/22
USPC .................. 261/66, 72.1, 84, 115, 121.1, 123
See application file for complete search history.

(56) References Cited

U.S. PATENT DOCUMENTS 2,149,670 A * 3/1939 Fetterly ........................ 261/50.3
2,324,580 A * 7/1943 Hight .......................... 222/145.7
(Continued)

FOREIGN PATENT DOCUMENTS

CN 2068984 1/1991
CN 2385791 7/2000
(Continued)

OTHER PUBLICATIONS

PCT International Search Report for PCT Counterpart Application No. PCT/CN2008/071733 containing Communication relating to the Results of the Partial International Search Report, 7 pgs., (Nov. 6, 2008).

(Continued)

*Primary Examiner* — Charles Bushey
(74) *Attorney, Agent, or Firm* — Blakely, Sokoloff, Taylor & Zafman LLP

(57) ABSTRACT

A liquid aeration system comprising: an intermittent liquid feeding means (10) located at an upstream position for receiving liquid from a liquid resource; a liquid storage means (20) located at an downstream position for receiving the liquid from the intermittent liquid feeding means (10) quantitatively and intermittently; and a pipe (30) connected between the intermittent liquid feeding means (10) and the liquid storage means (20), the outlet of which is located below the liquid surface of the liquid storage means (20), such that the liquid can flow from the intermittent liquid feeding means (10) through the pipe (30) into the liquid storage means (20) intermittently and quantitatively using the liquid level difference between the upstream position and the downstream position, so as to inject the air existed in the pipe (30) into the liquid in the liquid storage means (20).

11 Claims, 3 Drawing Sheets

(56) References Cited

U.S. PATENT DOCUMENTS

| | | |
|---|---|---|
| 4,278,546 A | 7/1981 | Roesler |
| 4,850,705 A | 7/1989 | Horner |
| 5,312,185 A | 5/1994 | Kojima et al. |
| 7,048,261 B2 * | 5/2006 | Wright .............................. 261/37 |
| 2004/0183218 A1 * | 9/2004 | Dyson ......................... 261/121.1 |

FOREIGN PATENT DOCUMENTS

| | | |
|---|---|---|
| CN | 1336850 | 2/2002 |
| DE | 24 43 568 A1 | 3/1975 |
| DE | 36 28 550 A1 | 4/1987 |
| DE | 36 10 737 A1 | 10/1987 |
| FR | 2 643 971 | 9/1990 |
| FR | 2720424 | 2/1995 |
| GB | 1045048 | 10/1966 |
| JP | 56-017625 | 2/1981 |

OTHER PUBLICATIONS

PCT Notification of Transmittal of International Preliminary Examination Report for PCT Application No. PCT/CN2008/071733 with full English translation: 12 pgs. (Feb. 9, 2010).

Written Opinion of the International Search Authority for PCT/CN2008/071733 with full English translation. 10 pgs. (Nov. 6, 2008).

* cited by examiner

SYSTEM FOR FEEDING GAS INTO LIQUID

CROSS-REFERENCE TO RELATED APPLICATIONS

This patent application is a U.S. National Phase application under 35 U.S.C. §371 of International Application No. PCT/CN2008/071733, filed on Jul. 24, 2008, entitled A SYSTEM FOR FEEDING GAS INTO LIQUID, which claims priority to Chinese patent application number 200710119934.7, filed Aug. 3, 2007.

TECHNICAL FIELD

The present invention relates to a liquid aeration system.

BACKGROUND

In the prior art, it is often needed to have liquid aerated.

For example, in the biological treatment of waste water (such as industrial waste water or household sewage), waste water often needs to be aerated, so as to provide with oxygen to the aerobic micro-organisms in the waste water. The micro-organisms are able to absorb, adsorb and oxidize the organic contaminants carried in the waste water, and decompose them to some simple inorganic materials such as oxidized carbon, water, sulfate, nitrate etc., that is, turn the toxic and harmful matters into non-toxic and harmless matters, so that the waste water is purified.

In aquaculture, if the content of oxygen dissolved in water is lower than 4 mg/L, fishes would hardly keep living, thus, it is necessary to add oxygen into the water providing with the essential oxygen for fishes' living. Less oxygen dissolved in the water indicates higher water pollution, and so it is more necessary to supply oxygen into the water.

Moreover, in the fields of food, pharmacy, chemical industries, etc. it often needs to add gas into liquids. In various applications, liquid is not only limited to water, and gas is not only limited to oxygen or air either.

However, in the existing technology, air is normally injected into liquids by means of a blower. As for the widely used biological treatment of waste water, the use of a blower would consume great amount of energy such as electricity, and would also cause environment pollution. In addition, using a blower to inject air directly into liquid, the oxygen dissolved in the liquid is very limited; instead, most of the air injected would be directly escaped from the liquid.

SUMMARY OF THE INVENTION

The object of the present invention is to provide a liquid aeration system, which almost will not consume any energy and pollute environment, and the production cost will be greatly reduced.

For achieving the above object, the present invention provides a liquid aeration system comprising: an intermittent liquid feeding means located at an upstream position for receiving liquid from a liquid resource; a liquid storage means located at an downstream position for receiving the liquid from the intermittent liquid feeding means quantitatively and intermittently; and a pipe connected between the intermittent liquid feeding means and the liquid storage means, the outlet of which is located below the liquid surface of the liquid storage means, such that the liquid can flow from the intermittent liquid feeding means through the pipe into the liquid storage means intermittently and quantitatively using the liquid level difference between the upstream position and the downstream position, so as to inject the air existed in the pipe into the liquid in the liquid storage means.

The intermittent liquid feeding means may use various appropriate means available in the prior art, such as the types of an overturning panel, a tipping bucket, a floating ball, a damping returning valve, a siphon, and an inverted siphon etc., or the type of a solenoid valve with liquid level transducer or timer, as long as these structures can make the liquid in the liquid feeding means flow through the pipe into the liquid storage means intermittently and quantitatively, so as to inject the air in the pipe into the liquid in the liquid storage means.

The liquid aeration system according to the present invention can automatically inject air into liquid by using the liquid level different (e.g. the universally existed water level difference in the nature) without the use of an air injecting means such as a blower. Therefore, it will not consume energy and pollute environment, and will save the cost maximally.

Moreover, when liquid is flowing through the pipe, the liquid would sufficiently contact with the air existed in the pipe, and the air can be sufficiently dissolved into the liquid. Thus, the dissolving degree of air in liquid is increased, and so the efficiency of injecting air into the liquid is increased, too.

The other additional features and advantages of the present invention will be described in detail with reference to the embodiments in conjunction with the accompany drawings.

DETAILED DESCRIPTION OF EMBODIMENTS

Figure 1:
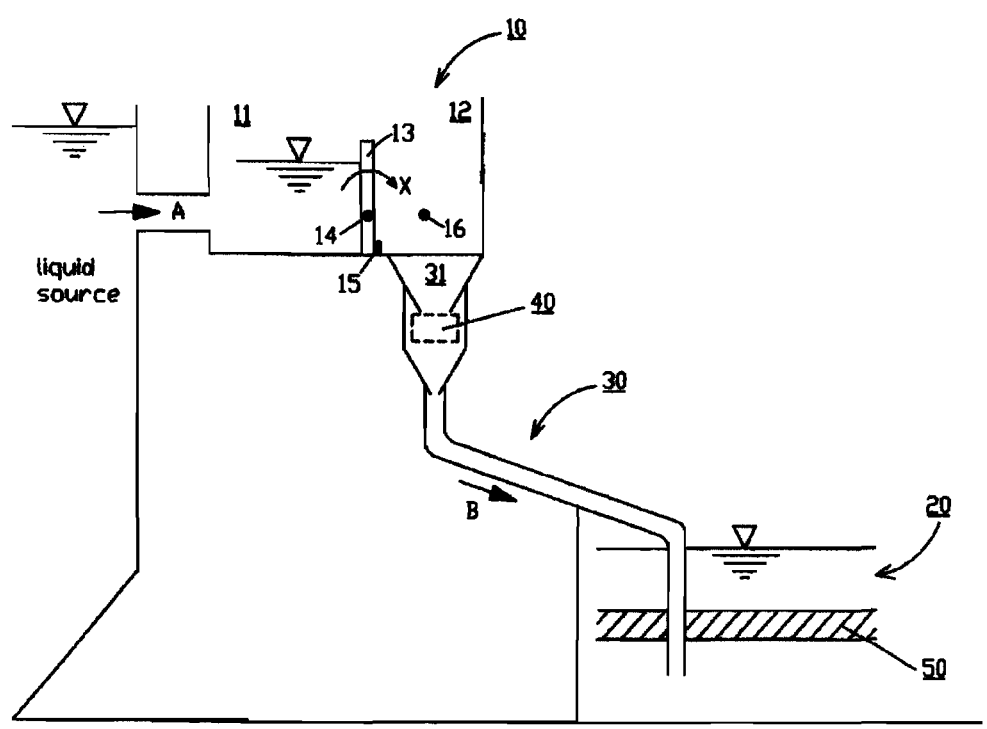
FIG. 1 is a schematic view of the structure of the liquid aeration system according to one embodiment of the present invention.

As shown in FIG. 1, according to one typical embodiment of the present invention, a liquid aeration system comprises: an intermittent liquid feeding means 10 located at an upstream position for receiving liquid from a liquid source; a liquid storage means 20 located at a downstream position for receiving the liquid from the intermittent liquid feeding means 10 intermittently and quantitatively; and a pipe 30 connected between the intermittent liquid feeding means 10 and the liquid storage means 20, the outlet of which is located below the liquid surface of the liquid storage means 20, such that the liquid can flow from the intermittent liquid feeding means 10 through the pipe 30 into the liquid storage means 20 intermittently and quantitatively using the liquid level difference between the upstream position and the downstream position, so as to inject the air existed in the pipe 30 into the liquid in the liquid storage means 20.

In this liquid aeration system, the energy to be used is the liquid potential (liquid level difference) existed between the upstream position and the downstream position, therefore, there is no need to use any additional aeration means such as a blower, and so it would not consume energy. When the present liquid aeration system is used for biological treatment of waste water, the water level difference commonly existed in the nature can be widely used, such as the water level difference between the waste water from sewage pipeline system or rainfall water and their downstream position, or the water level difference between different areas of terrain. When the present liquid aeration system is used for supplying oxygen to fishes in rivers or ponds for aquaculture, the water level difference produced either by the upstream river or by rainfall water can be widely used. Therefore, the liquid aeration system of the present invention can be widely and easily applied in various fields.

The main function of the intermittent liquid feeding means 10 is to intermittently and quantitatively inject the air existed in the pipe 30 into the liquid in the liquid storage means 20 located at the downstream position. Moreover, the intermittent liquid feeding means 10 also has the function of temporarily receiving and storing liquid, e.g. receiving liquid from the liquid source indicated by arrow A as shown in FIG. 1. When the liquid is accumulated to a certain amount, it will flow into the liquid storage means 20 through the pipe 30 as indicated by arrow B, thus, the air existed in the pipe 30 would be efficiently injected into the liquid in the liquid storage means 20. In addition, during the process that the intermittent liquid feeding means 10 is temporarily receiving and storing liquid, the pipe 30 may be open to atmosphere or other gas sources, and enable the pipe 30 being filled with gas such as air. When liquid is flowing through the pipe 30 into the liquid storage means 20, turbulence could be formed in the pipe 30 so as to facilitate the air existed in the pipe 30 to be sufficiently dissolved in the liquid. Every time when the liquid flows from the intermittent liquid feeding means 10 into the liquid storage means 20, the volume ratio of the quantity of the inflow liquid to the quantity of the air inside the pipe 30 may be in a certain value, so as to raise the dissolving efficiency of the air in the liquid. Preferably, the volume ratio of the quantity of the inflow liquid to the quantity of the air inside the pipe 30 is 1:1 to 1:6.

In order to inject the air inside the pipe 30 into the liquid in the liquid storage means 20 located at the downstream position, it is required that the outlet of the pipe 30 should be located below the liquid surface of the liquid storage means 20 in operation, and preferably, very close to the bottom of the liquid storage means 20, allowing the injected air to have sufficient time to be dissolved in the liquid. If the liquid storage means 20 contains liquid therein at the beginning, the outlet of the pipe 30 can be directly put below the liquid surface; Otherwise, the outlet of the pipe 30 can be preset at the predetermined location in the liquid storage means 20, preferably, close to the bottom, so that after the liquid aeration system is operated for a period of time, the outlet of the pipe 30 would be actually located below the liquid surface of the liquid storage means 20.

For realizing the above functions, the intermittent liquid feeding means 10 can be various appropriate means available in the existing technologies, such as the types of overturning panel, tipping bucket, floating ball, damping returning valve, siphon, inverted siphon etc., or the type of solenoid valve with liquid level transducer or timer, so long as these structures can make the liquid stored in the liquid feeding means 10 flow through the pipe 30 intermittently and quantitatively into the liquid storage means 20, so as to inject the air existed in the pipe 30 into the liquid contained in the liquid storage means 20.

As one embodiment, FIG. 1 shows an intermittent liquid feeding means 10.

As shown in FIG. 1, the intermittent liquid feeding means 10 is a structure of overturning panel, which mainly includes a liquid feeding tank 10a and a rotatable overturning panel 13 installed in the liquid feeding tank 10a. When the overturning panel 13 is in its original position (FIG. 1), the overturning panel 13 divides the liquid feeding tank 10a into a first portion 11 for receiving and storing liquid and a second portion 12 communicating with the outlet of the pipe 30. When the liquid stored in the first portion 11 is increased to a certain level, the overturning panel 13 begin to rotate from its original position by a certain angle in the direction indicated by the arrow X, such that the liquid stored in the first portion 11 flows into the second portion 12, and further flows through the pipe 30 into the liquid storage means 20 located at the downstream position.

The rotation of the overturning panel 13 is preferably automatically realized by increasing the liquid level in the first portion 11, however, it can also be realized by a driving mechanism such as an electric motor. Although the latter will consume some energy, it could be used in some specific applications, for instance, it would be appropriate for a smaller sized goldfish tank at homes or in hotels to use a small electric motor to realize intermittent rotation of the overturning panel 13.

As an example of automatically realizing rotation of the overturning panel by using the increase of liquid level in the first portion 11, the overturning panel 13 can be hinged on the side wall of the liquid feeding tank 10a by means of a hinge shaft 14, which divides the overturning panel 13 into a lower part of the overturning panel 13 below the hinge shaft 14 and an upper part of the overturning panel 13 above the hinge shaft 14, and the lower part of the overturning panel 13 is heavier than the upper part of the overturning panel 13, (e.g. the lower part can be made of a material different than the upper part, or a weight may be disposed on the lower part), and the upper part is longer than the lower part. When the liquid level in the first portion 11 is not high enough, due to the fact that the lower part of the overturning panel 13 is heavier and born bigger hydraulic pressure, the overturning panel 13 would not rotate. When the liquid level raises to a certain degree, the hydraulic pressure on the upper part of the overturning panel 13 would overcome the hydraulic pressure applied on and the gravity of the lower part of the overturning panel 13, the overturning panel 13 would automatically rotate around the hinge shaft in the direction indicated by the arrow X. Therefore, the liquid in the first portion 11 would flow into the second portion 12, and further flow via the pipe 30 into the liquid storage means 20 located at the downstream position.

The weight of the lower part and the weight of the upper part of the overturning panel 13 as well as the location of the hinge shaft 14 will determine the quantity of liquid flowing from the intermittent liquid feeding means 10 (i.e. the liquid feeding tank 10a) into the liquid storage means 20, that is, realize the quantitative liquid feeding. And also, the mixing ratio of the quantity of liquid flown from the intermittent liquid feeding means 10 into the liquid storage means 20 to the quantity of the air existed in the pipe 30 could be determined by designing, so as to raise the efficiency of dissolving air into the liquid.

When the liquid level in the first portion 11 is not high enough, in order to ensure that the overturning panel 13 can not rotate and the liquid can be stored in the first portion 11, a stop mechanism 15 can be provided to prevent the lower part of the overturning panel 13 from rotating towards the second portion 12 of the liquid feeding tank 10a. The stop mechanism 15 can be realized by simply attaching a stop block on the side wall of the intermittent liquid feeding means 10, however, the present invention is not limited to the stop block, for instance, it can be also realized by installing a spring mechanism.

Moreover, after the liquid in the intermittent liquid feeding means 10 flows via the pipe 30 into the liquid storage means 20, in order to make the overturning panel 13 returns back to its original position, a position limit mechanism 16 may be provided for the overturning panel 13 so as to limit the rotating angle of the upper part of the overturning panel 13 towards the second portion 12 of the liquid feeding tank 10a. Such a position limit mechanism 16 can also be realized by simply installing a piece of stop block on the side wall of the intermittent liquid feeding means 10.

Figure 2:
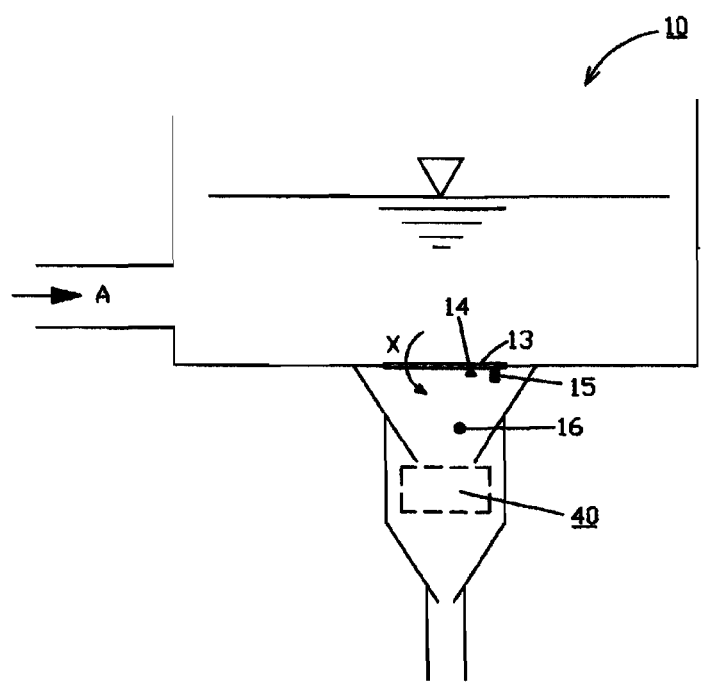
FIG. 2 is a schematic view of the structure of the intermittent liquid feeding means used in the liquid aeration system according to another embodiment of the present invention.

FIG. 2 shows another type of intermittent liquid feeding means 10, which is similar with that shown in FIG. 1.

As shown in FIG. 2, this type of intermittent liquid feeding means 10 mainly includes a liquid feeding tank 10a and a rotatable overturning panel 13 which is horizontally installed on the bottom of the overturning panel 13. The overturning panel 13 may be hinged on the bottom of the liquid feeding tank 10a via a hinge shaft 14, which divides the overturning panel 13 into the left part of the overturning panel 13 on the left side of the hinge shaft 14 and the right part of the overturning panel 13 on the right side of the hinge shaft 14, the area of the right part is smaller than that of the left part but the weight of the right part is heavier than that of the left part (this can be realized by using different materials or a weight). A stop block 15 is provided beneath the right part of the overturning panel 13. When the liquid in the liquid feeding tank 10a is insufficient, due to the fact that the right part of the overturning panel 13 is heavier and stopped by the stop block 15, the overturning panel 13 could not rotate. When the liquid in the liquid feeding tank 10a raised to a certain degree, the hydraulic pressure acting on the left part of the overturning panel 13 with bigger area would overcome the hydraulic pressure applied on the right part of the overturning panel 13 with smaller area and the gravity of the right part of the overturning panel 13, the overturning panel 13 will rotate around the hinge shaft 14 in the direction indicated by the arrow X, therefore, the liquid in the liquid feeding tank 10a would directly flow via the pipe 30 into the liquid storage means 20 located at the downstream position. After the liquid in the liquid feeding means 10 is flown via the pipe 30 into the liquid storage means 20, in order to enable the overturning panel 13 return to its original position, the overturning panel 13 could be provided with a position limit stop block 16 which would limit the rotating angle of the overturning panel 13.

Figure 3:
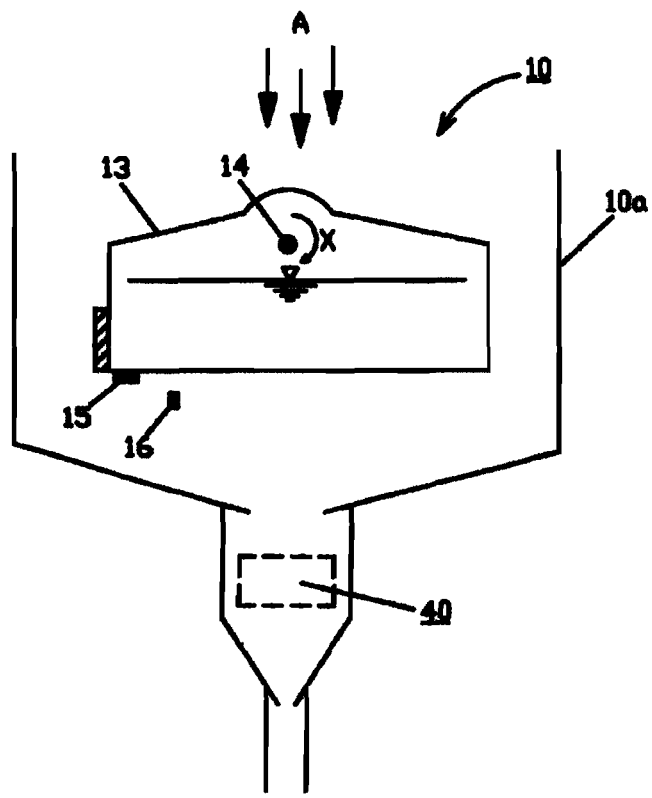
FIG. 3 is a schematic view of the structure of the intermittent liquid feeding means used in the liquid aeration system according to another embodiment of the present invention.
Figure 4:
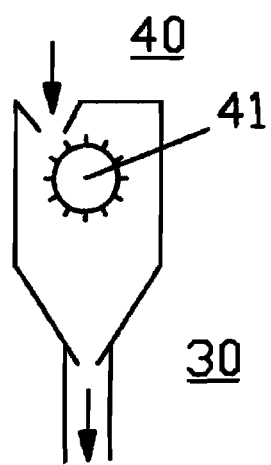
FIG. 4 is a schematic view of the structure of the liquid stirring means used in the liquid aeration system according to one embodiment of the present invention.

FIG. 3 shows a tipping bucket type intermittent liquid feeding means 10, which is similar with that shown in FIG. 1 and FIG. 2.

As shown in FIG. 3, the intermittent liquid feeding means 10 mainly includes a liquid feeding tank 10a and a rotatable tipping bucket 13 installed in the liquid feeding tank 10a. When the tipping bucket 13 is in its original position (as shown in FIG. 3), the tipping bucket 13 is used for receiving and storing liquid, as shown by the arrow A. When the liquid stored in the tipping bucket 13 is increased to a certain amount, the tipping bucket 13 would rotate from its original position by a certain angle, enable the liquid stored in the tipping bucket 13 flow into the liquid feeding tank 10a and further flow via the pipe 30 into the liquid storage means 20 located at the downstream position.

Same as the above overturning panel, the tipping bucket of this embodiment can also be rotated by various means and in various manners, but preferably in the manner of automatic rotation realized by increasing the liquid level.

To this end, the tipping bucket 13 can be hinged on the side wall of the liquid feeding tank 10a via a hinge shaft 14, which divides the tipping bucket 13 into the left part of the tipping bucket 13 on the left side of the hinge shaft 14 and the right part of the tipping bucket 13 on the right side of the hinge shaft 14, the left part is heavier than the right part (e.g. a weight is provided on the left part, as indicated by the shadow portion at the left side of the tipping bucket 13 in FIG. 3), moreover, the right part is longer than the left part. The tipping bucket 13 is provided with a stop mechanism such as a stop block 15 which can prevent the left part of the tipping bucket 13 from rotating downwards, and a position limit mechanism such as a stop block 16 which can limit the right part of the tipping bucket 13 from rotating downwards. When the liquid level in the tipping bucket 13 is insufficient, due to the fact that the left part of the tipping bucket 13 is heavier and stopped by the stop block 15, the tipping bucket 13 can not rotate. When the liquid level is increased to a certain degree, the liquid gravity applied on the right part of the tipping bucket 13 would overcome the liquid gravity applied on the left part of the tipping bucket 13 and its own gravity, so as to enable the tipping bucket 13 rotate around the hinge shaft 14 in the direction indicated by the arrow X, thus, the liquid in the tipping bucket 13 would flow to the liquid feeding tank 10a and further flow via the pipe 30 into the liquid storage means 20 located at the downstream position.

Through the above stated embodiments, the intermittent liquid feeding means 10 of the present invention has been explained. However, it is obvious that the present invention is not limited to these embodiments. As for a person skilled in this field, many other appropriate structures may be adopted for the realization of the intermittent liquid feeding means 10 of the present invention. For instance, in the existing technologies, the normally used floating ball type, damping returning valve type, siphon type, inverted siphon type and solenoid valves with liquid level transducer or timer etc. could be used for realizing the intermittent liquid feeding means 10 of the present invention, and their detailed description will be omitted.

As shown in FIG. 1, according to a preferred embodiment of the present invention, the liquid aeration system may also include a liquid stirring means 40 located at the inlet 31 of the pipe 30, for stirring the liquid flowing into the pipe 30 so that the liquid can be sufficiently mixed with the air existed in the pipe 30.

As an example, a liquid stirring means 40 is shown in FIG. 3, which mainly includes an impeller 41 rotatably disposed at the inlet 31 of the pipe 30. The liquid flowing into the pipe 30 impulses the blades of the impeller 41 and make the impeller 41 rotate, thus, the liquid is stirred and the air existed in the pipe 30 is sufficiently dissolved into the liquid.

Obviously, the liquid stirring means 40 of the present invention is not limited to the above example. It is obvious for those skilled in the art that any appropriate stirring means in the existing technologies can be used to realize the liquid stirring means 40 of the present invention, such as turbine type, blade type etc. According to the sort of energy sources, the liquid stirring means can be driven by hydraulic head, wind power, solar energy and electricity etc.

In a preferred embodiment according to the present invention, the liquid aeration system may further comprises a sprayer (not shown) disposed at the inlet 31 of the pipe 30, for dividing the liquid into a plurality of streamlets or droplets and spraying them into the pipe 30, so that the liquid can be sufficiently mixed with the air existed in the pipe 30. The sprayer can be constructed as a spraying nozzle or a screen. The sprayer can be used independently from or in combination with the liquid stirring means 40.

According to the present invention, the inlet of the pipe 30 is opened to atmosphere or connected directly with other gas sources so that the pipe 30 is full of air or gas. Alternatively, it is also possible to install a branch pipe on the pipe 30, and the gas can be injected into the pipe 30 via the branch pipe.

In order to make the air inside the pipe 30 sufficiently pre-dissolved into the liquid flowing through the pipe 30, the pipe 30 is preferably designed as a Z shape or a spiral shape, thus, the mixing time for the liquid flowing through the pipe 30 and air inside the pipe 30 would be longer and/or increase the air quantity inside the pipe 30.

For increasing the air dissolved in the liquid, the liquid is preferably flowing through the pipe 30 in the form of turbulence, which can be realized by properly designing of the liquid feeding means 10 and/or the pipe 30. In addition, as shown in FIG. 1, the pipe 30 may be designed as a plurality section pipes mutually connected with each other, making the outlet of upper section pipe obliquely insert into the inlet of next section pipe at their connecting points so as to form turbulence.

When the liquid aeration system of the present invention is used for biological treatment of waste water, as shown in FIG. 1, a biological rotary pan or a biological filtering bed may be installed in the liquid storage means 20 such as an aeration tank. The biological filtering bed 50 may possess huge amount of aerobic microorganisms. The biological filtering bed is disposed above the outlet of the pipe 30, so that the injected air is forced to pass through the filtering bed when floating up, therefore, the function of absorbing, adsorbing and oxidized decomposing of the microorganisms can be realized effectively.

The application of the liquid aeration system of the present invention doesn't need any air blasting means such as blower, thus, it almost will not consume any energy, production cost will be greatly reduced and it is very environment friendly. In addition, in the present invention, the air is injected by liquid into the liquid in the liquid storage means 20, therefore, compared with directly blowing air into liquid by a blower in the existing technology, the air can be more sufficiently dissolved in liquid. Moreover, through proper designing of the structures of the pipe 30 and other parts, such as increasing the turbulence inside the pipe 30 and adding liquid stirring means 40 etc., the efficiency of the air dissolving in the liquid can be increased.

The invention claimed is:

1. A liquid aeration system, comprising:
an intermittent liquid feeding means located at an upstream position for receiving liquid from a liquid source;
a liquid storage means located at a downstream position for receiving liquid intermittently and quantitatively from the liquid feeding means; and
a pipe connected between the intermittent liquid feeding means and the liquid storage means, the outlet of which is placed below the liquid surface of the liquid storage means, such that the liquid can flow from the intermittent liquid feeding means through the pipe into the liquid storage means intermittently and quantitatively using the liquid level difference between the upstream position and the downstream position, so as to inject the air existed in the pipe into the liquid in the liquid storage means.

2. The liquid aeration system of claim 1, wherein every time the volume ratio of the quantity of the liquid flown from the intermittent liquid feeding means into the liquid storage means to the quantity of the air existed in the pipe is 1:1 to 1:6.

3. The liquid aeration system of claim 1, wherein the intermittent liquid feeding means includes a liquid feeding tank and a rotatable overturning panel disposed in the liquid feeding tank,
when the overturning panel is in its original position, the overturning panel divides the liquid feeding tank into a first part for receiving and storing liquid and a second part communicated with the inlet of the pipe;
when the liquid stored in the first part is increased to a certain degree, the overturning panel is rotated from its original position by a certain angle so that the liquid stored in the first part flows into the second part and further flows through the pipe into the liquid storage means located at the downstream position.

4. The liquid aeration system of claim 3, wherein:
the overturning panel is hinged on the side wall of the liquid storage tank through a hinge shaft, which divides the overturning panel into a lower part which is below the hinge shaft and an upper part which is above the hinge shaft, the lower part is heavier than the upper part, and the upper part is longer than the lower part;
the overturning panel is provided with a stop mechanism for preventing the lower part of the overturning panel from rotating to the second part of the liquid feeding tank, and a limit mechanism for limiting the angle of the upper part of the overturning panel rotating to the second part of the liquid feeding tank.

5. The liquid aeration system of claim 1, wherein the intermittent liquid feeding means includes a liquid feeding tank and a rotatable tipping bucket disposed in the liquid feeding tank,
when the tipping bucket is in its original position, the tipping bucket is to receive and store liquid;
when the liquid stored in the tipping bucket is increased to a certain degree, the tipping bucket is rotated from its original position by a certain angle so that the liquid stored in the tipping bucket flows into the liquid feeding tank and further flows through the pipe into the liquid storage means located at the downstream position.

6. The liquid aeration system of claim 5, wherein:
the tipping bucket is hinged on the side wall of the liquid feeding tank through a hinge shaft, which divides the tipping bucket into a left part which is on the left side of the hinge shaft and a right part which is on the right side of the hinge shaft, the left part is heavier than the right part, and the right part is longer than the left part;
the tipping bucket is provided with a stop mechanism for preventing the right part of the tipping bucket from rotating downwards, and a limit mechanism for limiting the angle of the right part of the tipping bucket rotating downwards.

7. The liquid aeration system of claim 1, wherein this system further comprises a liquid stirring means which is located at the inlet of the pipe for stifling the liquid flowing into the pipe so that the liquid can be sufficiently mixed with the air existed in the pipe.

8. The liquid aeration system of claim 1, wherein the system further comprises a sprayer which is located at the inlet of the pipe for spraying the liquid into the pipe so that the liquid is sufficiently mixed with the air existed in the pipe.

9. The liquid aeration system of claim 7, wherein the liquid stifling means includes an impeller which is rotatably disposed at the inlet of the pipe, the liquid flowing into the pipe impacts the blades of the impeller to make the impeller rotate, so as to stir the liquid.

10. The liquid aeration system of claim 1, wherein the pipe is designed in a Z-shape or a spiral shape.

11. The liquid aeration system of claim 1, wherein the liquid is flowing through the pipe in the form of turbulent current.

* * * * *